(12) United States Patent
Lim et al.

(10) Patent No.: US 10,505,217 B2
(45) Date of Patent: Dec. 10, 2019

(54) RECHARGEABLE BATTERY

(71) Applicant: SAMSUNG SDI CO., LTD., Yongin-si, Gyeonggi-do (KR)

(72) Inventors: Byung-Ho Lim, Yongin-si (KR); Seok Gyun Park, Yongin-si (KR); Junsung Ahn, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 102 days.

(21) Appl. No.: 15/496,252

(22) Filed: Apr. 25, 2017

(65) Prior Publication Data

US 2018/0062198 A1 Mar. 1, 2018

(30) Foreign Application Priority Data

Aug. 25, 2016 (KR) .................. 10-2016-0108503

(51) Int. Cl.
*H01M 10/04* (2006.01)
*H01M 2/20* (2006.01)
*H01M 2/26* (2006.01)

(52) U.S. Cl.
CPC ....... *H01M 10/0468* (2013.01); *H01M 2/204* (2013.01); *H01M 2/263* (2013.01); *H01M 10/0431* (2013.01); *H01M 10/0436* (2013.01); *H01M 2220/30* (2013.01)

(58) Field of Classification Search
CPC .. H01M 2/204; H01M 2/263; H01M 10/0468; H01M 10/0481
USPC .......................................................... 429/186
See application file for complete search history.

(56) References Cited

U.S. PATENT DOCUMENTS

| 2012/0115025 | A1 | 5/2012 | Kim et al. | |
| 2012/0141849 | A1* | 6/2012 | Lin .................... | H01M 2/0217 429/94 |
| 2014/0045005 | A1* | 2/2014 | Schumann ........... | H01M 2/024 429/61 |

FOREIGN PATENT DOCUMENTS

| JP | 4747518 B2 | 5/2011 |
| JP | 2015-011895 A | 1/2015 |
| KR | 10-1198294 B1 | 10/2012 |

\* cited by examiner

*Primary Examiner* — Basia A Ridley
*Assistant Examiner* — James M Erwin
(74) *Attorney, Agent, or Firm* — Lee & Morse, P.C.

(57) ABSTRACT

A rechargeable battery includes an electrode assembly including a first electrode and a second electrode, a case accommodating the electrode assembly, a cap assembly sealing the case, and a fixing member in the case, the fixing member having a central portion overlapping the electrode assembly, and a wing extending outside of the electrode assembly based on the central portion, one surface of the wing being attached to an inner surface of the case.

12 Claims, 12 Drawing Sheets

RECHARGEABLE BATTERY

CROSS-REFERENCE TO RELATED APPLICATION

Korean Patent Application No. 10-2016-0108503, filed on Aug. 25, 2016, in the Korean Intellectual Property Office, and entitled: "Rechargeable Battery," is incorporated by reference herein in its entirety.

BACKGROUND

1. Field

The present disclosure relates to a rechargeable battery.

2. Description of the Related Art

With advancement of technologies for mobile devices, the demand for rechargeable batteries as an energy source has been increasing. A rechargeable battery differs from a primary battery in that it can be repeatedly charged and discharged, while the latter is incapable of being recharged.

The rechargeable battery includes an electrode assembly having a positive electrode plate, a separator, and a negative electrode plate, and a case which accommodates the electrode assembly. The electrode assembly is sorted into a spirally-wound type and a stacked type. A plurality of thin films are stacked in both the spirally-wound type of electrode assembly and the stacked type of electrode assembly.

SUMMARY

An exemplary embodiment provides a rechargeable battery including: an electrode assembly configured to include a first electrode and a second electrode; a case configured to accommodate the electrode assembly; a cap assembly configured to seal the case; and a fixing member configured to include a central portion overlapping the electrode assembly and a wing extending outside of the electrode assembly based on the central portion, wherein one surface of the wing may be attached to an inner surface of the case.

The wing may be spiral-wound at least one time based on a virtual axis parallel to a direction in which the electrode assembly is inserted into the case.

The wing may be bent toward the inner surface of the case.

The fixing member may include a first member and a second member respectively overlapping two lateral walls of the electrode assembly facing each other, and a width of the first member overlapping the electrode assembly may be narrower than that of the second member overlapping the electrode assembly.

One surface of the wing may correspond to one surface of the second member.

The first member may be integrally formed with the second member.

The fixing member may wrap a bottom surface of the electrode assembly.

The first member and the second member may be made of different materials.

A length of the wing may be longer than an interval between the case and the electrode assembly.

A height of the one surface of the wing may be about 3.5 mm to about 5 mm.

A plurality of the fixing members may be provided.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
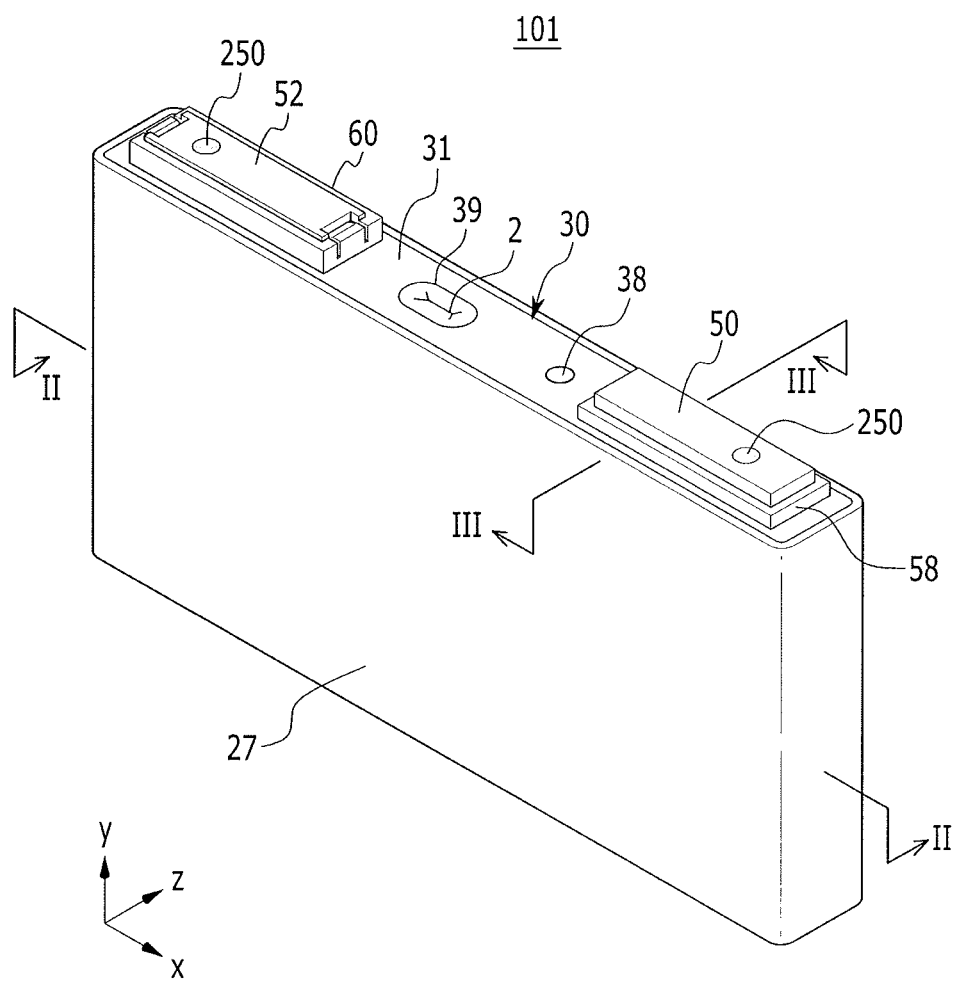
FIG. 1 illustrates a perspective view of a rechargeable battery according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

In addition, unless explicitly described to the contrary, the word "comprise" and variations such as "comprises" or "comprising" will be understood to imply the inclusion of stated elements but not the exclusion of any other elements. An upper part of a target portion indicates an upper part or a lower part of the target portion, and it does not mean that the target portion is always positioned at the upper side based on a gravitational direction.

Hereinafter, a rechargeable battery according to an exemplary embodiment will be described in detail with reference to FIGS. 1-3. FIG. 1 illustrates a perspective view of a rechargeable battery according to an exemplary embodiment, FIG. 2 illustrates a cross-sectional view taken along line II-II of FIG. 1, and FIG. 3 illustrates a cross-sectional view taken along line III-III of FIG. 1.

Figure 2:
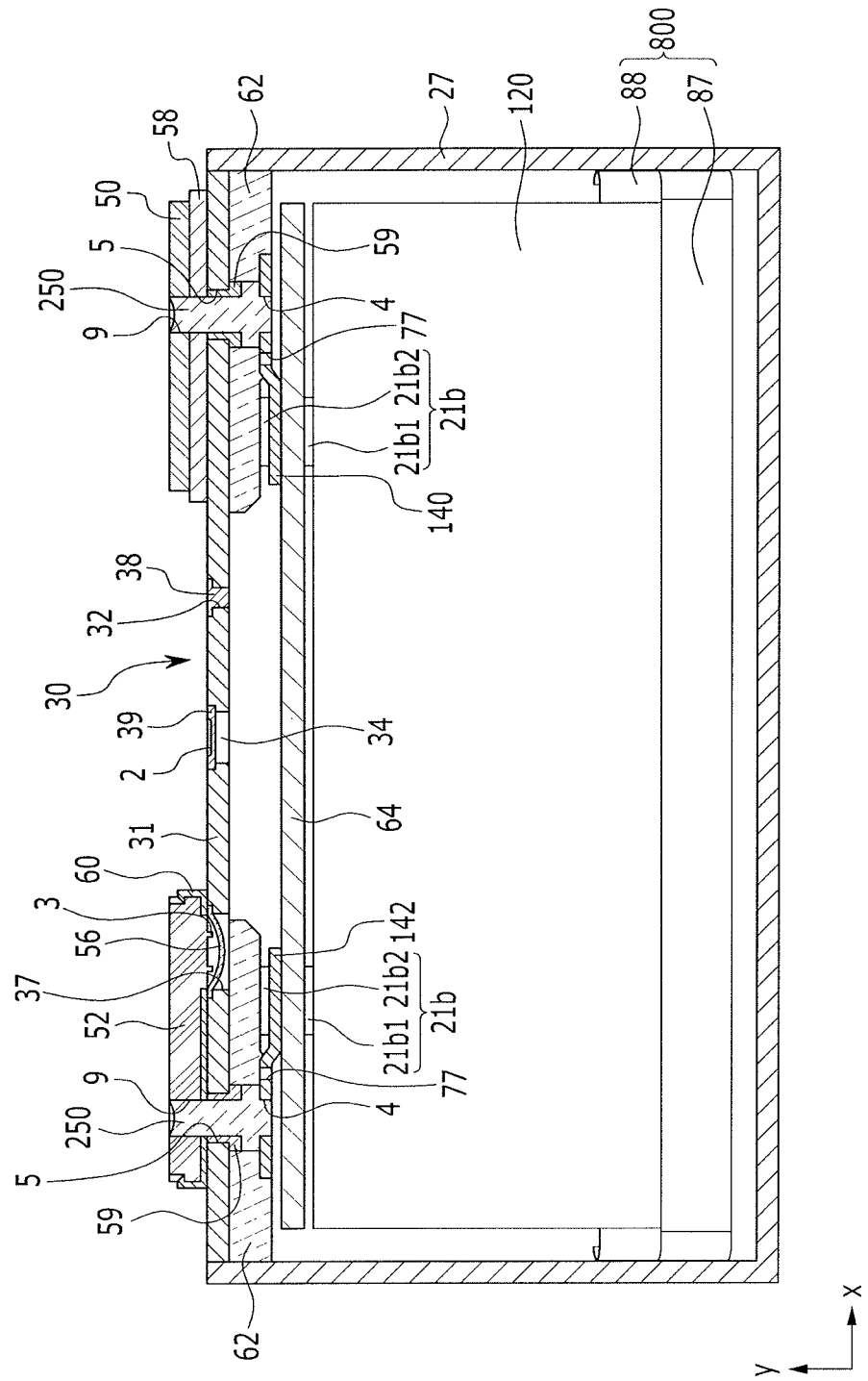
FIG. 2 illustrates a cross-sectional view taken along line II-II of FIG. 1.
Figure 3:
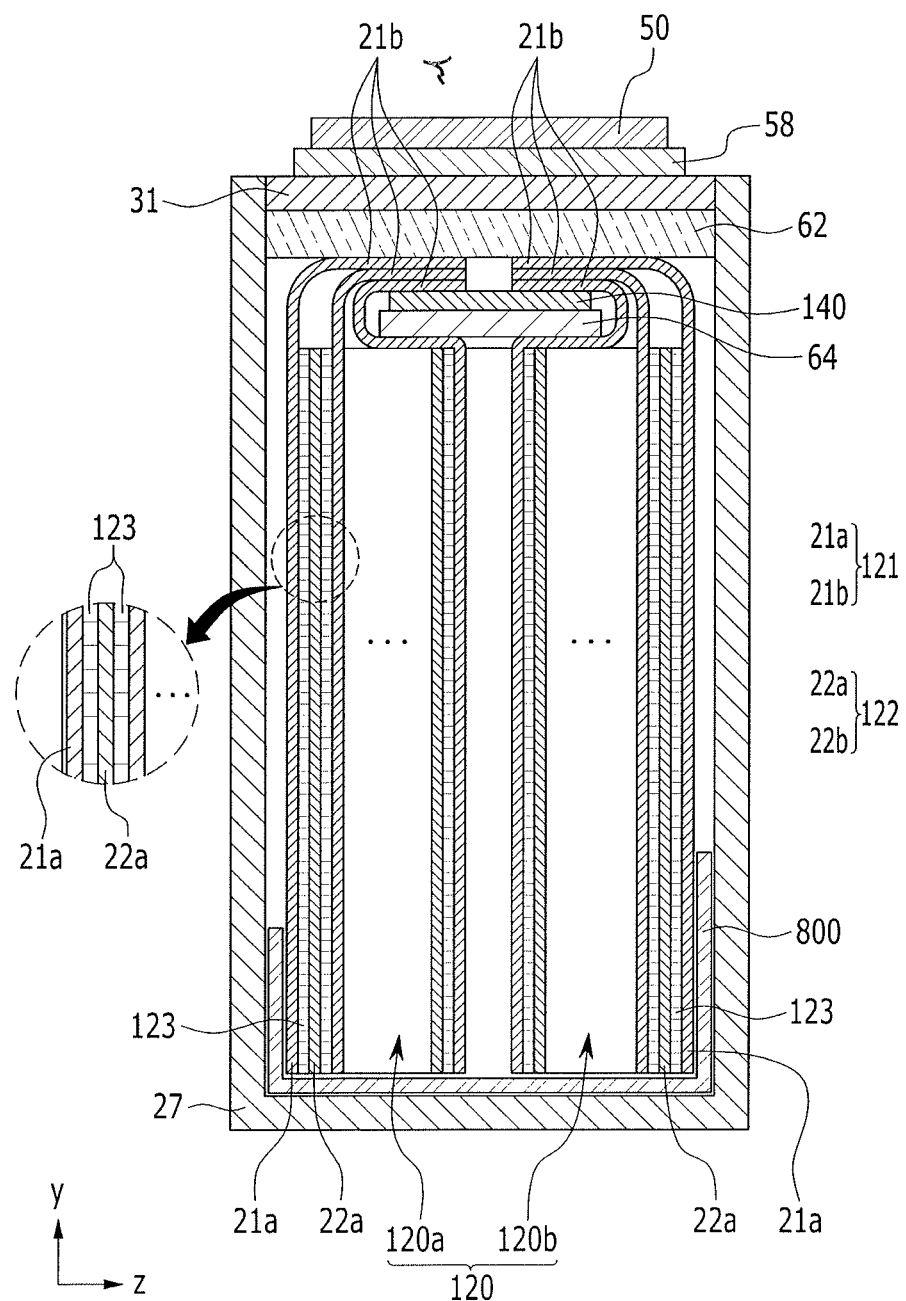
FIG. 3 illustrates a cross-sectional view taken along line III-III of FIG. 1.

As shown in FIG. 1 to FIG. 3, a rechargeable battery 101 according to an exemplary embodiment may include an electrode assembly 120 wound by interposing a separator 123 between a first electrode 121 and a second electrode 122, current collecting members 140 and 142 electrically connected to the electrode assembly 120, a case 27 in which the current collecting members 140 and 142 and the electrode assembly 120 are accommodated, and a cap assembly 30 combined to an opening of the case 27. The rechargeable battery 101 will be exemplarily described as being a lithium ion secondary battery having a prismatic shape. However, embodiments are not limited thereto and may be applicable to various types of batteries, e.g., a lithium polymer battery, a cylindrical battery, and the like.

The electrode assembly 120 may include a plurality of assemblies 120a and 120b, and each assembly 120a or 120b is spirally wound based on a winding axis in a state in which the separator 123 is interposed between the first electrode 121 and the second electrode 122 and then may be pressed to be flat. The first and second electrodes 121 and 122 respectively include first and second electrode coated regions 21a and 22a, where an active material is coated on a thin plate made of a metal foil, and first and second electrode uncoated regions 21b and 22b, where the active material is not coated thereon. For example, the first electrode 121 may be the positive electrode and the second electrode 122 may be the negative electrode.

The first electrode coated region 21a may be formed by coating a metal foil, e.g., aluminum, with an active material, e.g., a transition metal oxide and the like, and the second electrode coated region 22a may be formed by coating a metal foil, e.g., copper or nickel, with an active material, e.g., graphite, carbon, or the like. The first electrode uncoated region 21b and the second electrode uncoated region 22b are respectively formed to protrude in the same direction toward the cap assembly 30 from one side of the first electrode coated region 21a and one side of the second electrode coated region 22a. The first electrode uncoated region 21b and the second electrode uncoated region 22b are cut to protrude from the metal foil, and they may be respectively integrally formed with the metal foils of the first electrode coated region 21a and the second electrode coated region 22a. The first electrode uncoated region 21b and the second electrode uncoated region 22b have different polarities, and they are disposed to be spaced apart from each other.

In addition, since the first electrode 121 and the second electrode 122 are spiral-wound or overlapped, the first electrode uncoated region 21b and the second electrode uncoated region 22b may each be formed by overlapping a plurality of thin layers. As such, when the plurality of thin layers are formed to overlap each other, the thin layers may be connected to contact each other by ultrasonic welding to allow a current to easily flow. The separator 123 disposed between the first electrode coated region 21a and the second electrode coated region 22a may serve to prevent a short circuit and to allow lithium ions to move, and may be made of, e.g., polyethylene, polypropylene, or a composite film of polyethylene and polypropylene.

Figure 4:
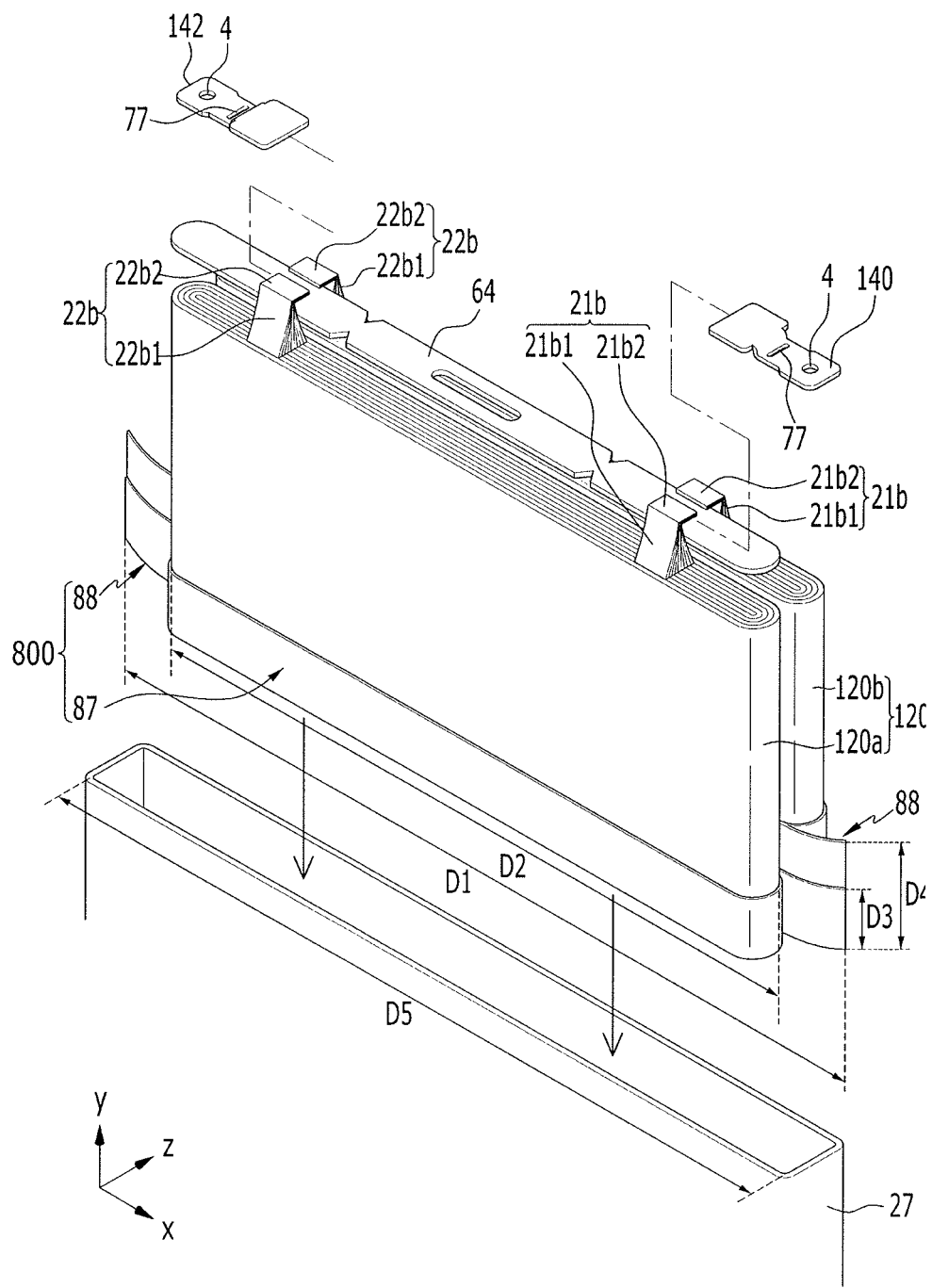
FIG. 4 illustrates a partially exploded perspective view of the rechargeable battery of FIG. 1.
Figure 5:
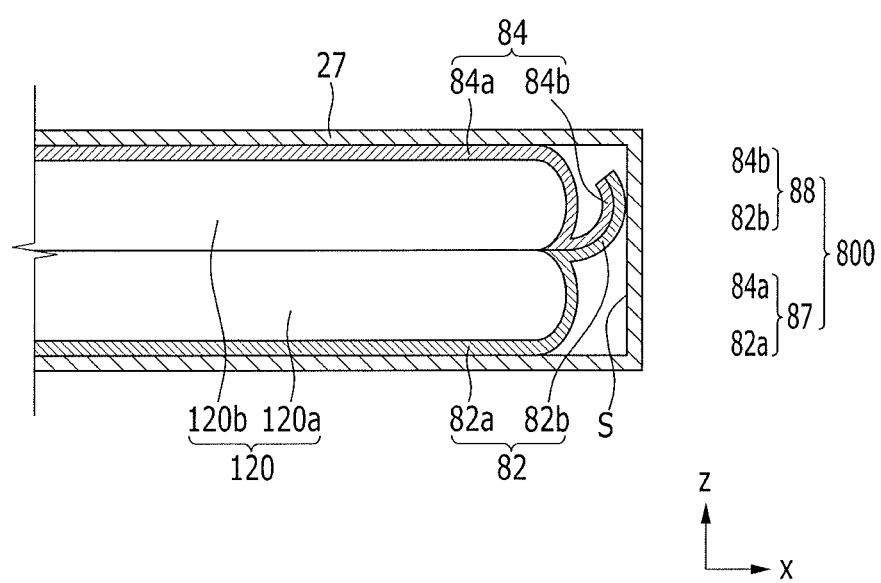
FIG. 5 schematically illustrates a transverse cross-sectional view of an electrode assembly, a fixing member, and a case of the rechargeable battery shown in FIG. 4.

As discussed previously, the electrode assembly 120 may include a plurality of electrode assemblies, which will be described with reference to FIG. 4 and FIG. 5. FIG. 4 and FIG. 5 exemplarily illustrate the electrode assembly 120 with the first electrode assembly 120a and the second electrode assembly 120b. That is, FIG. 4 illustrates a partially exploded perspective view of the rechargeable battery 101, and FIG. 5 schematically illustrates a transverse cross-sectional view of the electrode assembly 120, a fixing member, and the case 27 of the rechargeable battery 101.

As shown in FIG. 4, the first electrode assembly 120a and the second electrode assembly 120b included in the electrode assembly 120 may be electrically connected to each other. In the first electrode assembly 120a and the second electrode assembly 120b, the electrode uncoated regions of the same polarity are respectively electrically connected to each other by the current collecting members 140 and 142. For example, the first electrode uncoated region 21b of the first electrode assembly 120a and the first electrode uncoated region 21b of the second electrode assembly 120b are electrically connected by the first current collecting member 140, and the second electrode uncoated region 22b of the first electrode assembly 120a and the second electrode uncoated region 22b of the second electrode assembly 120b are electrically connected by the second current collecting member 142.

In this case, the first electrode uncoated region 21b of the first electrode assembly 120a and the first electrode uncoated region 21b of the second electrode assembly 120b are bent to face each other, and the second electrode uncoated region 22b of the first electrode assembly 120a and the second electrode uncoated region 22b of the second electrode assembly 120b are bent to face each other. Accordingly, each of the electrode uncoated regions 21b (and 22b) may include a first uncoated region 21b1 (and 22b1) connected to the metal foil of the electrode coated region to protrude toward the cap assembly, and a second uncoated region 21b2 (and 22b2) that extends from the first uncoated region and has a surface contacting the current collecting member 140 (and 142).

One surface of the first current collecting member 140 (a surface relatively closer to the cap plate) and one surface of each of the second uncoated regions 21b2 (a surface relatively closer to the current collector) contact to be electrically connected, and one surface of the second current collecting member 142 (a surface relatively closer to the cap plate) and one surface of each of the second uncoated regions 22b2 (a surface relatively closer to the current collector) contact to be electrically connected.

The first current collecting member 140 and the second current collecting member 142 may have the same shape. Each of the first current collecting member 140 and the second current collecting member 142 may include a first terminal hole 4 and a fuse hole 77.

The first terminal hole 4, into which a connecting terminal 250 is inserted, may be formed to have the same shape as a transverse cross-section of the connecting terminal 250, e.g., a circular shape. The connecting terminals 250 are respectively connected to a first terminal 50 and a second terminal 52 of the outside of the cap assembly 30 (refer to FIG. 2) to allow a current to flow.

The fuse hole 77 is formed by eliminating some of the first and second current collecting members 140 and 142, and a width of a periphery portion of the fuse hole 77 is narrower than those of other portions, thus a fuse may be formed therein. The fuse, when an overcurrent flows due to an abnormal reaction of the rechargeable battery, is easily broken such that a current flow is cut off.

A lower portion of the electrode assembly 120 is wrapped by a fixing member 800, and the electrode assembly 120 may be inserted into the case 27 in a direction parallel to the winding axis and may be substantially received in the case 27 together with an electrolyte solution. The electrolyte solution may include an organic solvent, e.g., ethylene carbonate (EC), propylene carbonate (PC), diethyl carbonate (DEC), ethyl methyl carbonate (EMC), and dimethyl carbonate (DMC), and a lithium salt, e.g., $LiPF_6$ and $LiBF_4$. The electrolyte solution may be a liquid, a solid, or a gel.

Referring to FIG. 4 and FIG. 5, the fixing member 800 includes a central portion 87 overlapping the electrode assembly 120, and a wing 88 extending outside of the electrode assembly 120. For example, as illustrated in FIG. 4, the central portion 87 may be a flat portion extending, e.g., directly, on the electrode assembly 120, e.g., along an entire length of the electrode assembly 120 in the X direction and around an edge of the electrode assembly 120 in the Z direction. For example, as further illustrated in FIGS. 4-5, the wing 88 may extend from the central portion 87 away from the electrode assembly 120, e.g., toward an inner surface of the case 27.

In detail, the fixing member 800 includes a strip type of first member 82 and a strip type of second member 84 respectively attached to opposite sides of the electrode assembly 120, and each of the first and second members 82 and 84 may be provided with, e.g., define, the central portion 87 and the wing 88. For example, portions 82*a* and 84*a*, in which the first and second members 82 and 84 overlap the electrode assembly 120, form the central portions 87 of the fixing member 800. For example, as illustrated in FIG. 5, portions 82*a* and 84*a* overlap first and second electrode assemblies 120*a* and 120*b*, respectively, such that the portions 82*a* and 84*a* may define a single central portion 87 surrounding, e.g., continuously, an entire perimeter of two electrode assemblies 120 adjacent to each other. For example, portions 82*b* and 84*b*, of which the first and second members 82 and 84 extend outside of the electrode assembly 120, are bonded to each other to form the wing 88. For example, as illustrated in FIG. 5, portions 82*b* and 84*b* may overlap each other and extend along each other from the central portion 87, e.g., from a point where the portions 82*a* and 84*a* contact each other, towards the case 27.

The first member 82 and the second member 84 may be separately formed, but are not limited thereto, and may be integrally formed (refer to FIG. 6 to FIG. 9). The first member 82 and the second member 84 may be made of, e.g., polyethylene terephthalate (PET), oriented polystyrene (OPS), or the like, and the first member 82 and the second member 84 may be made of the same material, but are not limited thereto, e.g., the first member 82 and the second member 84 may be made of different elastic materials.

One surface of each of the first member 82 and the second member 84 may have adhesion, or the first member 82 and the second member 84 may respectively include an adhesive layer (not shown) of which an adhesive material is coated. The first member 82 and the second member 84 are attached to the electrode assembly 120 by the surfaces having the adhesion (hereinafter referred to as 'adhesive surface(s)').

A first width D1 of the fixing member 800 crossing the electrode assembly 120, i.e., a total width of the fixing member 800 along the X direction when both the central portion 87 and the wing 88 of a single electrode assembly 120 are extended along the X direction, is greater than a second width D2 of the electrode assembly 120, i.e., a width of the electrode assembly 120 along the X direction. Thus, the first width D1 extends beyond the electrode assembly 120 along the X direction. Accordingly, portions of the first member 82 and the second member 84 extending beyond the electrode assembly 120 wrap lateral surfaces of the electrode assembly 120, e.g., portions 82*a* wrap around edges of the first electrode assembly 120*a* to contact portions 84*a* wrapped around edges of the second electrode assembly 120*b*, and are combined with each other to form the wing 88, e.g., portions 82*b* and 84 are combined with each other to form the wing 88.

The first member 82 and the second member 84 may have different first and second heights D3 and D4, respectively. For example, the first height D3 of the first member 82 along the Y direction may be smaller than the second height D4 of the second member 84 along the Y direction. As such, when the first and second heights D3 and D4 of the first member 82 and the second member 84 are different, one adhesive surface of the first member 82 and the second member 84 positioned at the wing 88 is exposed, e.g., a portion of the adhesive surface of the second member 84 with the larger height D4 may be exposed since not completely covered by the first member 82.

The first width D1 of the fixing member 800 attached to the electrode assembly 120 may be greater than a third width D5 inside the case 27. Accordingly, when the electrode assembly 120 is inserted into the case 27, the wing 88 of the fixing member 800 may be convexly bent toward the case 27 so that the wing 88 of the fixing member 800 is not blocked by the case 27 and is easily inserted thereinto. The convexly bent portion of the wing 88 of the fixing member 800 may contact an inner surface (S) of the case 27, and the wing 88 may be attached to the case 27 through the exposed adhesive surface.

In the exemplary embodiment described above, although it is illustrated that the fixing member 800 is disposed at the lower portion of the electrode assembly 120, embodiments are not limited thereto. For example, the fixing member 800 may be disposed in plural as will be described in detail with reference to FIG. 6.

Figure 6:
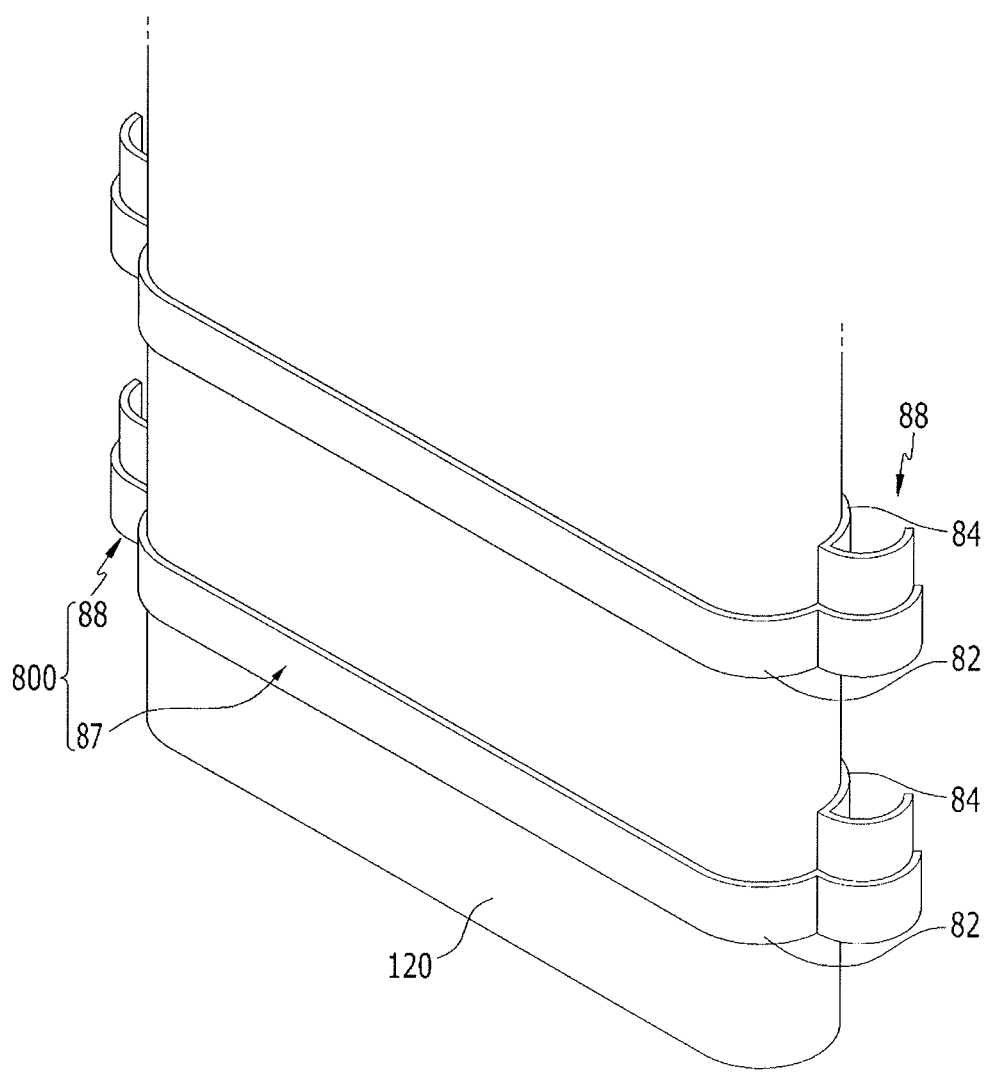
FIG. 6 illustrates a schematic view of a portion of a rechargeable battery according to another exemplary embodiment.

FIG. 6 illustrates a schematic view of a portion of a rechargeable battery according to another exemplary embodiment.

Referring to FIG. 6, a plurality of fixing members 800 may be disposed around the electrode assembly 120. For example, the strip type of fixing members 800 are respectively positioned at the lower portion of and between the upper portion and the lower portion of the electrode assembly 120. In this case, the first member 82 and the second member 84 of the fixing member 800 positioned at the lower portion of the electrode assembly 120 may be integrally formed to wrap the bottom surface of the electrode assembly 120, and the first member 82 and the second member 84 of the fixing member 800 positioned between the upper portion and the lower portion of the electrode assembly may be separated. For example, the plurality of fixing members 800 may be vertically spaced apart from each other along the electrode assembly 120.

As in the exemplary embodiment, when the electrode assembly 120 is attached to the inner surface of the case 27 through the fixing member 800, even if movement of or impact on the rechargeable battery occurs, movement of the electrode assembly 120 may be minimized due to the fixing member 800. Therefore, it is possible to prevent the electrode assembly 120 from being damaged due to the external impact.

Referring back to FIGS. 1 to 3, the case 27 may be formed to have a cuboidal shape, and one surface thereof is provided with an opening. The case 27 may be made of a metal material, e.g., aluminum, stainless steel, etc.

The cap assembly 30 may include a cap plate 31 for covering the opening of the case 27, the first terminal 50 that protrudes outside the cap plate 31 and is electrically connected to the first electrode 121, and the second terminal 52 that protrudes outside the cap plate 31 and is electrically connected to the second electrode 122. The cap plate 31 may be formed to have a plate shape extending in one direction, and is combined with the opening of the case 27. The cap plate 31 may be made of the same material as the case 27, and may be combined with the case 27 through a laser welding process. Accordingly, the cap plate 31 may have the same polarity as that of the case 27.

The cap plate 31 may further include an electrolyte injection opening 32 for injecting an electrolyte solution, and a second terminal hole 5 into which the connecting terminal 250 is inserted. In addition, a vent plate 39 provided with a notch 2 that can be opened under a predetermined pressure is installed in a vent hole 34. A sealing cap 38 is installed in the electrolyte injection opening 32, and the connecting terminal 250 is inserted into the second terminal hole 5.

The first terminal 50 and the second terminal 52 are respectively combined with the connecting terminal, and are positioned on the cap plate 31. The first terminal 50 is electrically connected to the first electrode 121 through the first current collecting member 140, and the second terminal 52 is electrically connected to the second electrode 122 through the second current collecting member 142. However, embodiments are not limited thereto, and the first terminal 50 may be electrically connected to the second electrode and the second terminal 52 may be electrically connected to the first electrode.

The first terminal 50 may have a rectangular plate shape. The first terminal 50 is inserted not only into the third terminal hole 9 formed in the first terminal 50, but also into the first terminal hole 4 and the second terminal hole 5 to be electrically connected to the first electrode 121 through the connecting terminal 250 bonded to the first current collecting member 140.

In this case, the connecting terminal 250 is formed to have a pillar shape, and its upper end portion is inserted into the third terminal hole 9 to be fixed to the first terminal 50 by welding. A lower end portion of the connecting terminal 250 is inserted into the first terminal hole 4 to be fixed to the first current collecting member 140 by welding. Accordingly, the first electrode 121 may be electrically connected to the first terminal 50 through the first current collecting member 140 and the connecting terminal 250. The second terminal hole 5 between the connecting terminal 250 and the cap plate 31 is sealed by a sealing gasket 59.

In a like manner of the first terminal 50, the second terminal 52 is electrically connected to the second electrode 122 through the connecting terminal 250 and the second current collecting member 142 inserted into the first to third terminal holes 4, 5, and 9. A connecting member 58 is disposed between the first terminal 50 and the cap plate 31, and a first insulating member 60 is disposed between the second terminal 52 and the cap plate 31.

Accordingly, since the case 27 and the cap plate 31 are electrically connected to the first terminal 50 through the connecting member 58, they are charged with the same polarity as that of the first electrode 121. The second terminal 52 is insulated from the cap plate 31 by the first insulating member 60.

The second terminal 52 extends in one direction to cover a short-circuit hole 37 formed in the cap plate 31. Accordingly, the first insulating member 60 may be disposed to extend along the second terminal 52, and may be formed to surround a lateral surface of the second terminal 52. The first insulating member 60 includes a cutout corresponding to the short-circuit hole 37, and a short-circuit protrusion 3 protruding toward the short-circuit hole 37 through the cutout is formed at the lower portion of the second terminal 52.

A short-circuit member 56 that is connected to a lateral wall of the short-circuit hole 37 and allows the first electrode 121 and the second electrode 122 to be short-circuited is installed at the short-circuit hole 37 of the cap plate 31. The short-circuit member 56 includes a curved portion curved in a convex arc shape toward the electrode assembly 120, and an edge portion formed outside the curved portion and fixed to a lateral wall of the short-circuit hole 37.

When gas is generated due to an abnormal reaction in the rechargeable battery, internal pressure of the rechargeable battery increases. When the internal pressure of the rechargeable battery is higher than a predetermined pressure, the curved portion becomes convex toward the second terminal 52 and contacts the short-circuit protrusion 3 of the second terminal 52 to cause a short circuit. As such, when the short circuit occurs, since cell reaction no longer occurs, it is possible to prevent explosion and the like due to increase of the internal pressure.

A second insulating member 62 is disposed between the cap plate 31 and the first and second current collecting members 140 and 142, and a third insulating member 64 is disposed between the first and second current collecting members 140 and 142 and the electrode assembly 120. The second insulating member 62 and the third insulating member 64 may support the first current collecting member 140 and the second current collecting member 142 in addition to providing insulation.

Hereinafter, a method of wrapping the fixing member 800 around the electrode assembly 120 will be described in detail with reference to the accompanying drawings.

Figure 7:
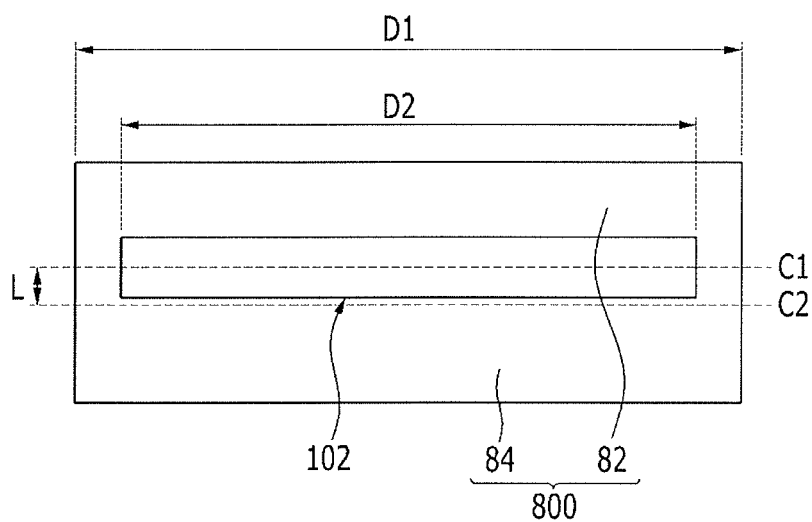
FIG. 7 to FIG. 9 illustrate schematic views for explaining a method of wrapping a fixing member around an electrode assembly according to an exemplary embodiment.
Figure 8:
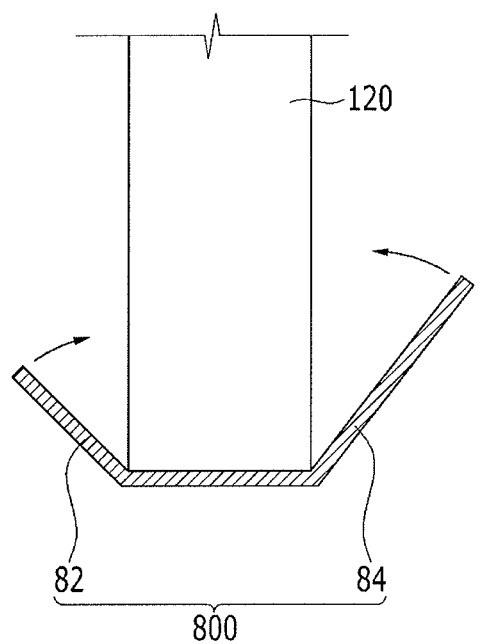
Figure 9:
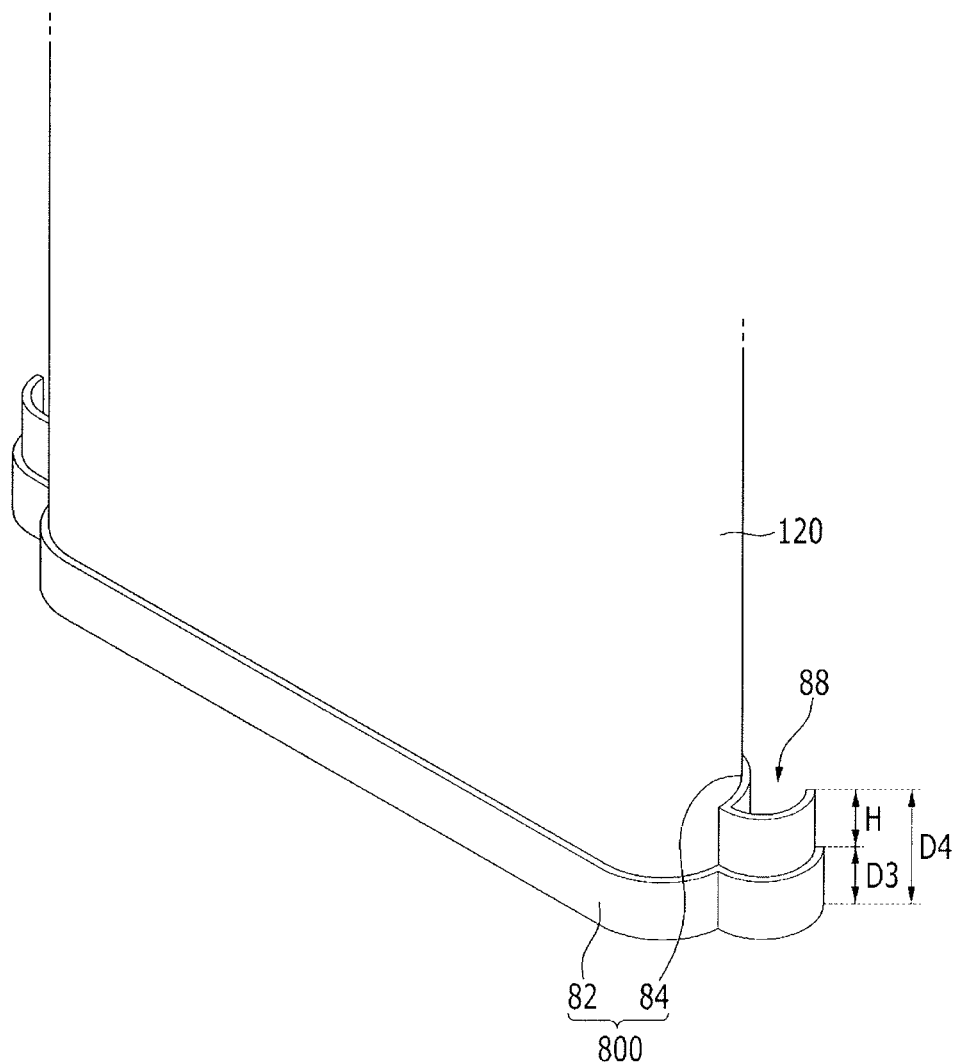
Figure 10:
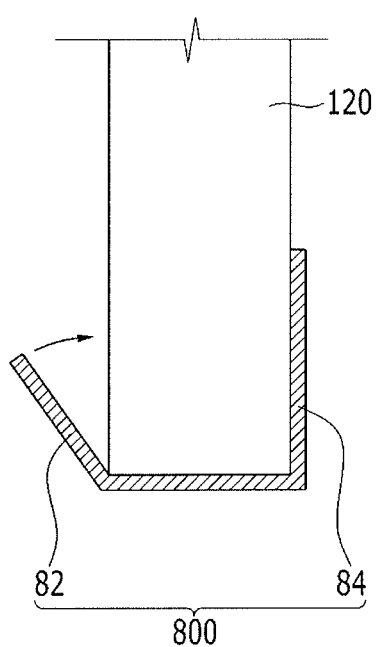
FIG. 10 illustrates a schematic view for explaining a method of wrapping a fixing member around an electrode assembly according to another exemplary embodiment.

FIG. 7 to FIG. 9 illustrate schematic views for explaining a method of wrapping the fixing member 800 around the electrode assembly 120 according to the exemplary embodiment, and FIG. 10 illustrates a schematic view for explaining a method of wrapping the fixing member around the electrode assembly according to another exemplary embodiment.

As shown in FIG. 7, the sheet type fixing member 800 is prepared, and the electrode assembly 120 is aligned on the fixing member 800. One surface of the fixing member 800 may be formed to have adhesion, and a bottom surface 102 of the electrode assembly 120 is positioned on the adhesive surface.

A center line C1 (hereinafter referred to as a first center line) of the bottom surface of the electrode assembly 120 is disposed to be spaced apart from a center line C2 (hereinafter referred to as a second center line) of the fixing member 800 by a predetermined distance L. The fixing member 800 includes the first member 82 and the second member 84 positioned at an opposite side to the bottom surface of the electrode assembly 120, and the first member 82 and the second member 84 may be integrally combined.

Then, as shown in FIG. 8 and FIG. 9, the first member 82 and the second member 84 are folded to be attached to the lateral walls of the electrode assembly 120. Since the second width D2 of the electrode assembly 120 is smaller than the first width D1 of the fixing member 800 (refer to FIG. 7), the fixing member 800 protrudes beyond the electrode assembly 120. Further, since the protruding portion of the fixing member 800 does not overlap the electrode assembly 120, the adhesive surfaces of the first member 82 and the second member 84 are bonded to each other to form the wing 88.

The first center line C1 is disposed to be spaced apart from the second center line C2, thus first and second heights D3 and D4 (refer to FIG. 4) of the fixing member 800 overlapping the lateral walls of the electrode assembly 120 positioned at a side opposite to the bottom surface 102 may be different. As such, due to the difference of heights of the fixing member overlapping the lateral wall, one surface of the first or second member 82 or 84 positioned at the wing, i.e., one surface having adhesion, may be exposed. For example, when one surface of the higher second member 84 is exposed, a height H of the exposed surface is equal to the predetermined distance L between the first center line C1 and the second center line C2.

The height H of the exposed member is formed to be about 3.5 mm to about 5 mm so that the fixing member 800 may be attached to the inner surface of the case 27 by the adhesive surface of the exposed member. When the height H is less than about 3.5 mm, an area of the adhesive surface is too small, so the fixing member may not be properly attached to the inner surface of the case 27. When the height H is greater than about 5 mm, an area of the adhesive surface is too large, so it may be hard to attach the fixing member to the inner surface of the case.

In the exemplary embodiment described above, it is illustrated that the bottom surface is attached to the fixing member 800 and then the electrode assembly 120 is wrapped by the fixing member 800, but the embodiments are not limited thereto. For example, as shown in FIG. 10, the first member 82 or the second member 84 may be attached to the electrode assembly 120 and then the remaining member may be folded to wrap the lower portion of the electrode assembly 120.

Figure 11:
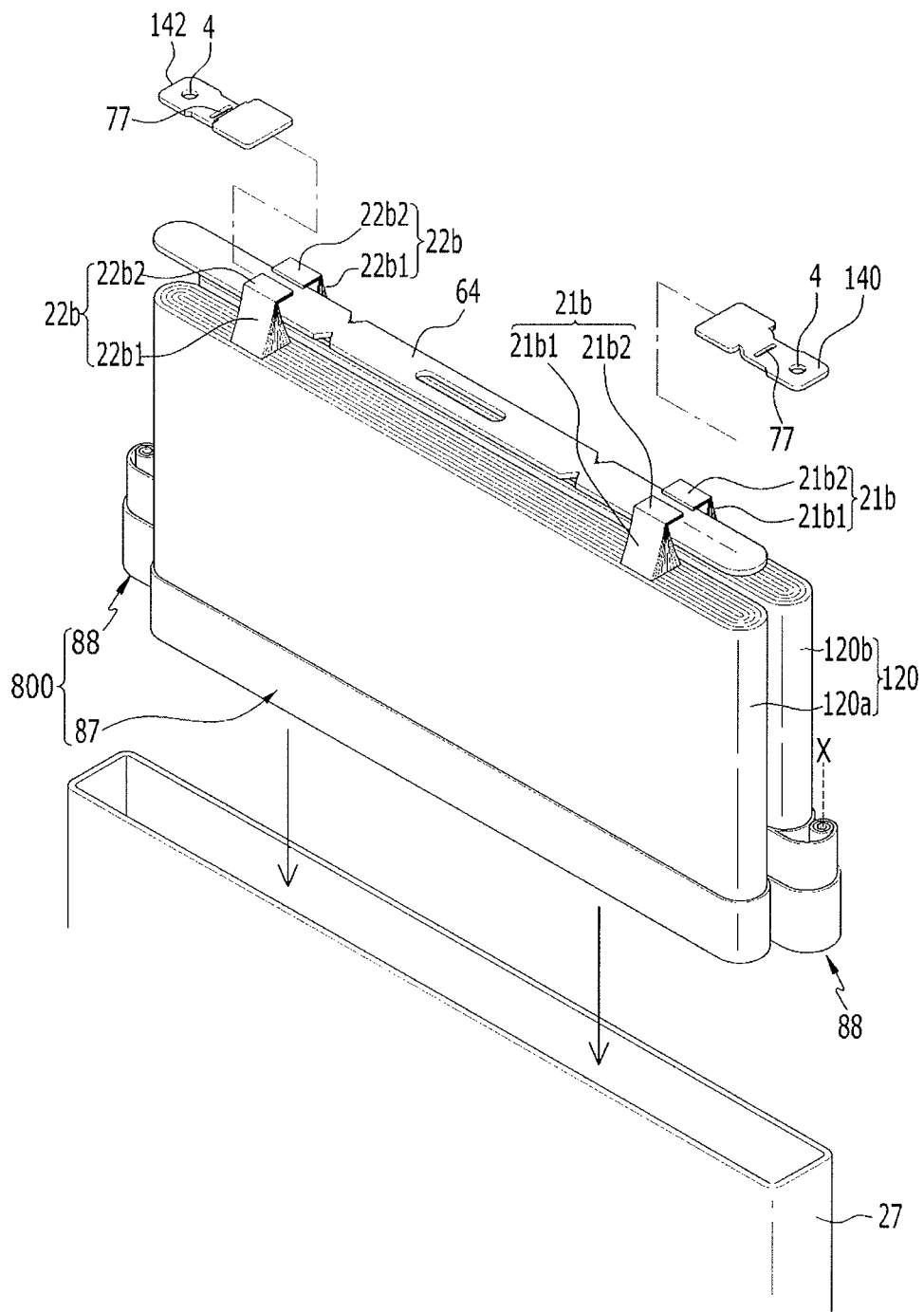
FIG. 11 illustrates a partially exploded perspective view of a rechargeable battery according to another exemplary embodiment.
Figure 12:
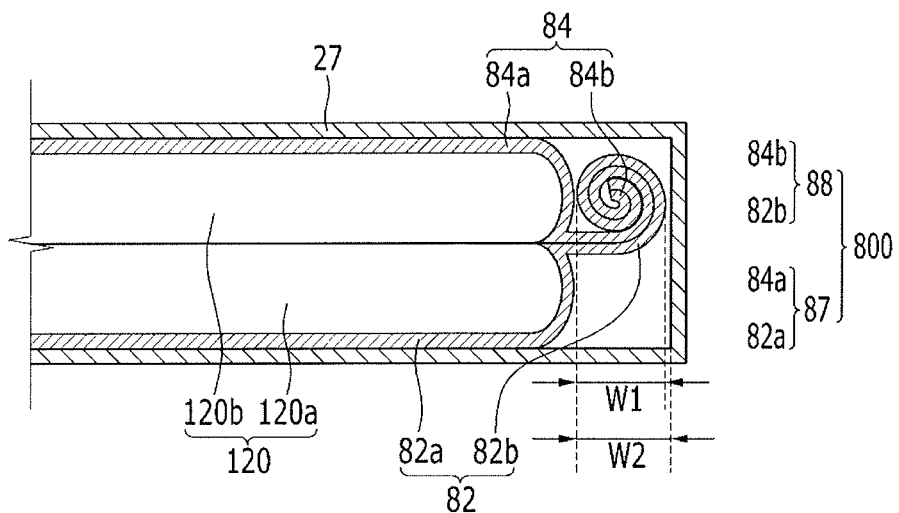
FIG. 12 and FIG. 13 schematically illustrate transverse cross-sectional views of an electrode assembly, a fixing member, and a case of the rechargeable battery shown in FIG. 11.
Figure 13:
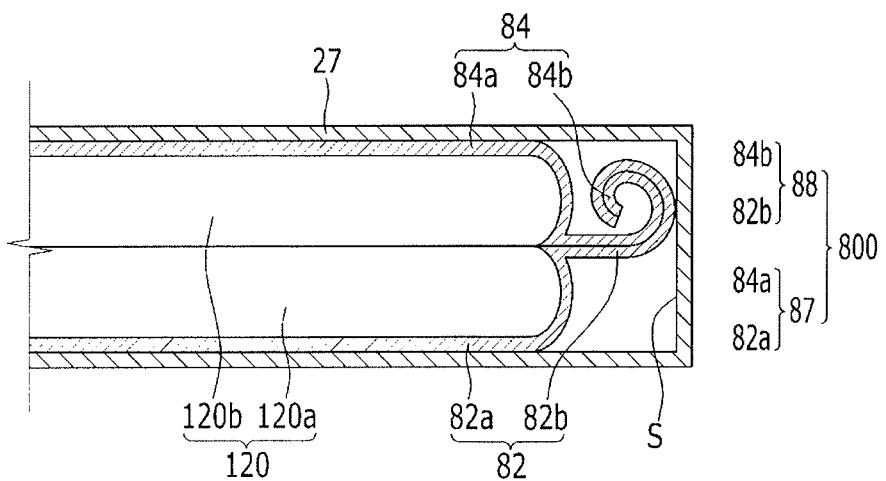

FIG. 11 illustrates a partially exploded perspective view of a rechargeable battery according to another exemplary embodiment, and FIG. 12 and FIG. 13 schematically illustrate transverse cross-sectional views of an electrode assembly, a fixing member, and a case of the rechargeable battery shown in FIG. 11.

The rechargeable batteries shown in FIG. 11 to FIG. 13 are substantially the same as that shown in FIG. 4, and therefore, only different parts will now be described in detail.

As shown in FIG. 11 and FIG. 12, a rechargeable battery according to another exemplary embodiment includes the electrode assembly 120, the case 27, and the fixing member 800. The fixing member 800 includes the central portion 87 and the wing 88.

In detail, the central portion 87 includes the portions 82a and 84a of the first member 82 and the second member 84 overlapping the electrode assembly 120, and the portions 82b and 84b of the first member 82 and the second member 84 extending outside of the electrode assembly 120 are bonded to each other to form the wing 88. Since widths, e.g., heights, of the first member 82 and the second member 84 are different, the adhesive surface of the second member 84 positioned at the wing 88 may be exposed.

As illustrated in FIGS. 11-12, the wing 88 of the fixing member 800 is spiral-wound at least one time based on a virtual axis I parallel to the direction in which the electrode assembly 120 is inserted into the case 27. As such, when the wing is formed in a roll form by spiral-winding the wing based on the virtual axis X, it may be tightly attached to the inner surface of the case 27. In detail, a diameter W1 of the spiral-wound wing 88 is smaller than a distance W2 from the inner surface of the case 27 to the lateral wall of the electrode assembly 120 such that the electrode assembly 120 may be easily inserted into the case 27.

The fixing member 800 may include PET or OPS, which contains an elastic material. If necessary, the first member 82 and the second member 84 of the fixing member 800 may have different materials, e.g., different elastic materials.

Referring to FIG. 13, when the fixing member 800 is made of the elastic material, after the electrode assembly 120 is inserted into the case 27, the wing 88 is spread toward the inner surface S of the case 27 by its elasticity, such that the wing 88 may be attached to the inner surface S of the case 27 by the exposed adhesive surface. In this case, the adhesive surface of the wing 88 may be further strongly attached to the inner surface S of the case by the spreading force of the wing 88.

As in the exemplary embodiments, by forming the wing 88 and then attaching it to the inner surface of the case 27, it is possible to minimize the movement of the electrode assembly 120 due to external impact. Further, by allowing the wing 88 to absorb the external impact, it is possible to reduce the impact applied to the electrode assembly 120. Accordingly, it is possible to prevent the electrode assembly from being damaged due to the external impact.

By way of summation and review, a spirally-wound type of electrode assembly, which is wound based on a winding axis thereof after a thin plate is stacked, should maintain a certain predetermined form even after being spirally wound. However, when an external impact, e.g., from falling and the like, is applied to the rechargeable battery, the electrode assembly may be deformed, thus a short circuit may occur inside the outermost wound thin plate. The short circuit may induce an abnormal reaction and may generate heat and gas, thereby deteriorating performance of the rechargeable battery.

In contrast, example embodiments provide a rechargeable battery that may prevent a short circuit and the like from occurring in an electrode assembly thereof by minimizing free movement of the electrode assembly even if an impact is applied to the rechargeable battery. That is, according to example embodiments, it is possible to minimize free movement of an electrode assembly by fixing the electrode assembly to an inner surface of a case through a fixing member with adhesion. Accordingly, a short circuit and the like due to the free movement of the electrode assembly depending on an external impact may be prevented.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
   an electrode assembly including a first electrode and a second electrode;
   a case accommodating the electrode assembly;
   a cap assembly sealing the case; and
   a fixing member in the case, the fixing member including:
     a central portion overlapping the electrode assembly, and
     a wing extending beyond the electrode assembly based on the central portion, one surface of the wing being attached to an inner surface of the case, wherein:

the fixing member includes a first member and a second member respectively overlapping two lateral walls of the electrode assembly facing each other, and a width of the first member overlapping the electrode assembly is narrower than that of the second member overlapping the electrode assembly.

2. The rechargeable battery as claimed in claim 1, wherein one surface of the wing corresponds to one surface of the second member.

3. The rechargeable battery as claimed in claim 1, wherein the first member is integral with the second member.

4. The rechargeable battery as claimed in claim 3, wherein the fixing member wraps a bottom surface of the electrode assembly.

5. The rechargeable battery as claimed in claim 1, wherein the first member and the second member are made of different materials.

6. The rechargeable battery as claimed in claim 1, wherein a length of the wing is longer than a distance between the case and the electrode assembly.

7. The rechargeable battery as claimed in claim 1, wherein a height of the one surface of the wing is about 3.5 mm to about 5 mm.

8. The rechargeable battery as claimed in claim 1, wherein a plurality of the fixing members are provided.

9. The rechargeable battery as claimed in claim 1, wherein the wing is spiral-wound at least one time based on a virtual axis parallel to a direction in which the electrode assembly is inserted into the case.

10. The rechargeable battery as claimed in claim 1, wherein the wing is bent toward the inner surface of the case.

11. The rechargeable battery as claimed in claim 1, wherein the central portion and the wing are parts of a same layer.

12. The rechargeable battery as claimed in claim 1, wherein one surface of the wing includes an adhesive surface that attaches to an inner surface of the case.

* * * * *